United States Patent
Hashizume et al.

(10) Patent No.: US 11,535,348 B2
(45) Date of Patent: Dec. 27, 2022

(54) SAILING ASSISTING SYSTEM FOR VESSEL

(71) Applicant: HONDA MOTOR CO., LTD., Tokyo (JP)

(72) Inventors: Takashi Hashizume, Wako (JP); Akifumi Fujima, Wako (JP); Hiroshi Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 931 days.

(21) Appl. No.: 16/337,208

(22) PCT Filed: Mar. 31, 2017

(86) PCT No.: PCT/JP2017/013852
§ 371 (c)(1),
(2) Date: Mar. 27, 2019

(87) PCT Pub. No.: WO2018/179443
PCT Pub. Date: Oct. 4, 2018

(65) Prior Publication Data
US 2019/0291832 A1 Sep. 26, 2019

(51) Int. Cl.
*B63B 49/00* (2006.01)
*B63H 20/08* (2006.01)
(Continued)

(52) U.S. Cl.
CPC .............. *B63B 49/00* (2013.01); *B63B 79/10* (2020.01); *B63B 79/40* (2020.01); *B63H 20/08* (2013.01);
(Continued)

(58) Field of Classification Search
CPC ......... B63B 49/00; B63B 79/40; B63B 79/10; B63B 43/18; B63H 20/08; B63H 21/22; B63H 25/02; G05D 1/0066; G05D 1/0206
See application file for complete search history.

(56) References Cited

U.S. PATENT DOCUMENTS 5,129,345 A * 7/1992 Senften .................. B63B 43/18
440/6
7,335,071 B1 * 2/2008 Motsenbocker ....... B63H 23/30
440/71
(Continued)

FOREIGN PATENT DOCUMENTS

EP   1520782 A2   4/2005
EP   3048038 A1   7/2016
(Continued)

OTHER PUBLICATIONS

European Search Report dated Jun. 13, 2019, 8 pages.
(Continued)

*Primary Examiner* — Yazan A Soofi
*Assistant Examiner* — Naeem Taslim Alam
(74) *Attorney, Agent, or Firm* — Rankin, Hill & Clark LLP

(57) ABSTRACT

A sailing assisting system is provided in which a sailing assist for a vessel which enters a specific water area where sailing of the vessel is limited is realized through a simple configuration and in which a steersman is prevented from having strange feeling. A sailing assisting system includes movable controlling devices (a shift and throttle controller, a steering device, a trim switch), actuators (a rotational shaft drive unit, a shaft drive unit, a switch drive unit) for driving these controlling devices, and a control unit for executing a notification operation and controlling the actuators to limit movable ranges of the controlling devices if a hull is determined to stay within a specific water area where the sailing of the hull is limited based on information on the specific water area and information on the position of the hull.

6 Claims, 7 Drawing Sheets

(51) Int. Cl.
  *B63H 21/22* (2006.01)
  *B63H 25/02* (2006.01)
  *G05D 1/00* (2006.01)
  *G05D 1/02* (2020.01)
  *B63B 79/10* (2020.01)
  *B63B 79/40* (2020.01)
  *B63B 43/18* (2006.01)

(52) U.S. Cl.
  CPC ............ *B63H 21/22* (2013.01); *B63H 25/02* (2013.01); *G05D 1/0066* (2013.01); *G05D 1/0206* (2013.01); *B63B 43/18* (2013.01)

(56) References Cited

U.S. PATENT DOCUMENTS

| | | | | |
|---|---|---|---|---|
| 9,418,558 | B1* | 8/2016 | Stamenkovich | G01C 21/203 |
| 9,927,520 | B1* | 3/2018 | Ward | G01S 15/93 |
| 10,118,681 | B1* | 11/2018 | Andrasko | G05D 3/12 |
| 10,196,122 | B1* | 2/2019 | Andrasko | B63H 25/02 |
| 10,214,271 | B1* | 2/2019 | Gonring | B63B 79/10 |
| 2003/0220724 | A1* | 11/2003 | Kaji | G05D 1/0206 |
| | | | | 114/102.1 |
| 2005/0075016 | A1* | 4/2005 | Bertetti | B63H 25/42 |
| | | | | 440/84 |
| 2010/0030410 | A1* | 2/2010 | Faller | B63H 21/22 |
| | | | | 701/21 |
| 2011/0143608 | A1* | 6/2011 | Chiecchi | B63H 20/08 |
| | | | | 440/53 |
| 2011/0151732 | A1* | 6/2011 | Chiecchi | B63H 20/08 |
| | | | | 701/21 |
| 2012/0028517 | A1* | 2/2012 | Mochizuki | B63H 20/04 |
| | | | | 440/53 |
| 2013/0035009 | A1 | 2/2013 | Kuriyagawa et al. | |
| 2013/0102206 | A1 | 4/2013 | Fujino et al. | |
| 2013/0189884 | A1* | 7/2013 | Jones | B63H 25/02 |
| | | | | 440/71 |
| 2013/0269583 | A1* | 10/2013 | Miller | B63B 21/16 |
| | | | | 114/263 |
| 2015/0277442 | A1* | 10/2015 | Ballou | G05D 1/0027 |
| | | | | 701/2 |
| 2016/0375972 | A1* | 12/2016 | Andrasko | G05D 1/0875 |
| | | | | 440/1 |
| 2017/0158297 | A1* | 6/2017 | Sampson | B63H 20/10 |
| 2017/0285645 | A1* | 10/2017 | Nakagawa | G01S 13/937 |
| 2017/0365175 | A1* | 12/2017 | Harnett | B63H 20/14 |
| 2018/0057132 | A1* | 3/2018 | Ward | B63H 25/42 |
| 2018/0259344 | A1* | 9/2018 | Rachmawati | G08G 3/00 |
| 2019/0315446 | A1* | 10/2019 | Ito | B63G 8/16 |

FOREIGN PATENT DOCUMENTS

| | | |
|---|---|---|
| JP | 2003-341592 | 12/2003 |
| JP | 2007-203840 | 8/2007 |
| JP | 2013-086668 | 5/2013 |
| WO | 00/15496 A1 | 3/2000 |

OTHER PUBLICATIONS

European Office Action dated Feb. 1, 2021, 5 pages.
International Search Report, dated Jun. 13, 2017 (dated Jun. 13, 2017), 1 page.

* cited by examiner

SAILING ASSISTING SYSTEM FOR VESSEL

TECHNICAL FIELD

The present invention relates to a sailing assisting system for a vessel.

BACKGROUND ART

Vessels are known which acquire information on their positions by a receiver for Global Navigation Satellite System (GNSS) such as Global Positioning System (GPS) to execute various types of controls (for example, refer to Patent Documents 1 and 2).

Patent Document 1 describes a control system for a vessel for changing control parameters of an engine in a water area where a sailing speed of the vessel is limited such that the vessel sails at an appropriate or required sailing speed within the water area.

Patent Document 2 describes a control system for a vessel which makes all functions thereof available for use within a saleable area while applying a limitation on the function out of the saleable area. This control system prohibits a reverse sailing of a vessel out of the saleable area and controls an engine such that a sailing speed of the vessel does not exceed a threshold within the saleable area and a speed limiting area.

PRIOR ART DOCUMENTS

Patent Documents

Patent Document 1: JP-A-2003-341592
Patent Document 2: JP-A-2013-86668

SUMMARY OF THE INVENTION

Problem to be Solved by the Invention

In the vessels described in Patent Documents 1 and 2, the sailing thereof is assisted by changing the control parameters of the engine between the inside and outside of a specific area. However, in this configuration, the control of the engine becomes complex, which increases the production costs of the propelling system such as an outboard engine or an inboard engine attached to the vessel.

In addition, although the control parameters of the engine are changed automatically by a computer, it is difficult for a steersman who controls the steering wheel or the throttle lever to understand the details of the changes, which causes strange feeling to the steersman.

The invention has been made in view of the above circumstances, and an object of the invention is to provide a sailing assisting system for a vessel which realizes a sailing assist for the vessel when the vessel enters or approaches a specific water area where the sailing of the vessel is limited area by a simple configuration and which prevents causing strange feeling to a steersman.

Means for Solving the Problem

The following configurations (1) to (5) will be provided to achieve the object.

(1) A sailing assisting system (e.g., a sailing assisting system 1 which will be described later) for a vessel including:

a movable controlling device (e.g., a shift and throttle controller 34, a steering device 35, a trim switch 36 which will be described later) configured to instruct a revolution speed of a propeller included in a propelling system (e.g., an outboard engine 20) for the vessel and a posture of the propelling system;

an actuator (e.g., a rotational shaft drive unit 34*m*, a shaft drive unit 35*m*, a switch drive unit 36*m*) configured to drive the controlling device;

a positional information acquisition unit (e.g., a positional information acquisition unit 21A) configured to acquire positional information of a hull to which the propelling system is attached;

a determination unit (e.g., a determination unit 21C, 21*c*) configured to determine, based on the positional information and information on a specific water area where sailing is limited, whether the hull stays within the specific water area or whether there is a possibility that the hull enters the specific water area; and a control unit (e.g., a control unit 21E, 21*e*) configured to control the actuator to limit a movable range of the controlling device if the determination unit determines that the hull stays within the specific water area or that there is a possibility that the hull enters the specific water area.

(2) The sailing assisting system according to (1), wherein if the determination unit determines that the hull stays within a speed limiting water area as the specific water area where a first sailing speed is set, the control unit limits the movable range of the movable controlling device so that the movable controlling device instructs the revolution speed to be in a range where the first sailing speed constitutes an upper limit value of a sailing speed.

(3) The sailing assisting system according to (1) or (2), wherein the controlling device includes a trim angle controlling unit (e.g., the trim switch 36) configured to instruct a trim angle of the propelling system as the posture, and wherein if the determination unit determines that the hull stays within a shallow water area or a water area with sunken rocks as the specific water area, the control unit limits a movable range of the trim angle controlling unit to a range where a contact between the propelling system and a seabed is avoided.

(4) The sailing assisting system according to (1) or (2), wherein the controlling device includes a direction instructing and controlling device (e.g., the steering device 35) configured to instruct a direction of the propelling system as the posture, and wherein if the determination unit determines that there is a possibility that the hull enters a shallow water area, a water area with sunken rocks or a sailing prohibiting water area as the specific water area, the control unit limits a movable range of the direction instructing and controlling device to a range where the hull is unable to enter the specific water area.

(5) The sailing assisting system according to (1) or (2), wherein the controlling device includes a sailing direction instructing and controlling device (e.g., the shift and throttle controller 34) instructing a rotational direction of the propeller, and wherein if the determination unit determines that there is a possibility that the hull enters a shallow water area, a water area with sunken rocks or a sailing prohibiting water area as the specific water area, the control unit limits a movable range of the sailing direction instructing and controlling device to a range where the hull is unable to sail forwards.

(6) The sailing assisting system according to any one of (1) to (5), further including:

a notification unit (e.g., a notification unit 21D, 21d) configured to execute notification if the determination unit determines that the hull stays within the specific water area or that there is a possibility that the hull enters the specific water area.

Effects of the Invention

The system of (1) limits the movable range of the controlling device when the hull enters the specific water area where the sailing of the hull is limited or there is a possibility that the hull enters the specific water area. This allows the steersman to control the sailing of the hull appropriately within the specific water area or to control the sailing of the hull appropriately to prevent the entrance of the hull to the specific water area by operating the controlling device within the movable range. Limiting the movable range of the controlling device can control the sailing of the hull, thereby making it possible to provide the assist in sailing the vessel through the simple configuration. The steersman can recognize instinctively that the sailing of the hull is being assisted through the limit applied on the movable range.

The system of (2) can support the sailing of the hull at a required sailing speed within the speed limiting water area.

The system of (3) can support the safe sailing of the hull within the shallow water area or the water area with sunken rocks.

The system of (4) can support the safe sailing of the hull by preventing the entrance of the hull to the specific water area.

The system of (5) can support the safe sailing of the hull by preventing the entrance of the hull to the specific water area.

The system of (6) can support the safe sailing of the hull, since the steersman can confirm in advance that the movable range of the controlling device is limited, that the trim angle is changed or that the hull is restricted from entering the specific water area.

DETAILED DESCRIPTION OF EMBODIMENTS

Hereinafter, an embodiment of the invention will be described by reference to the drawings.

Figure 1:
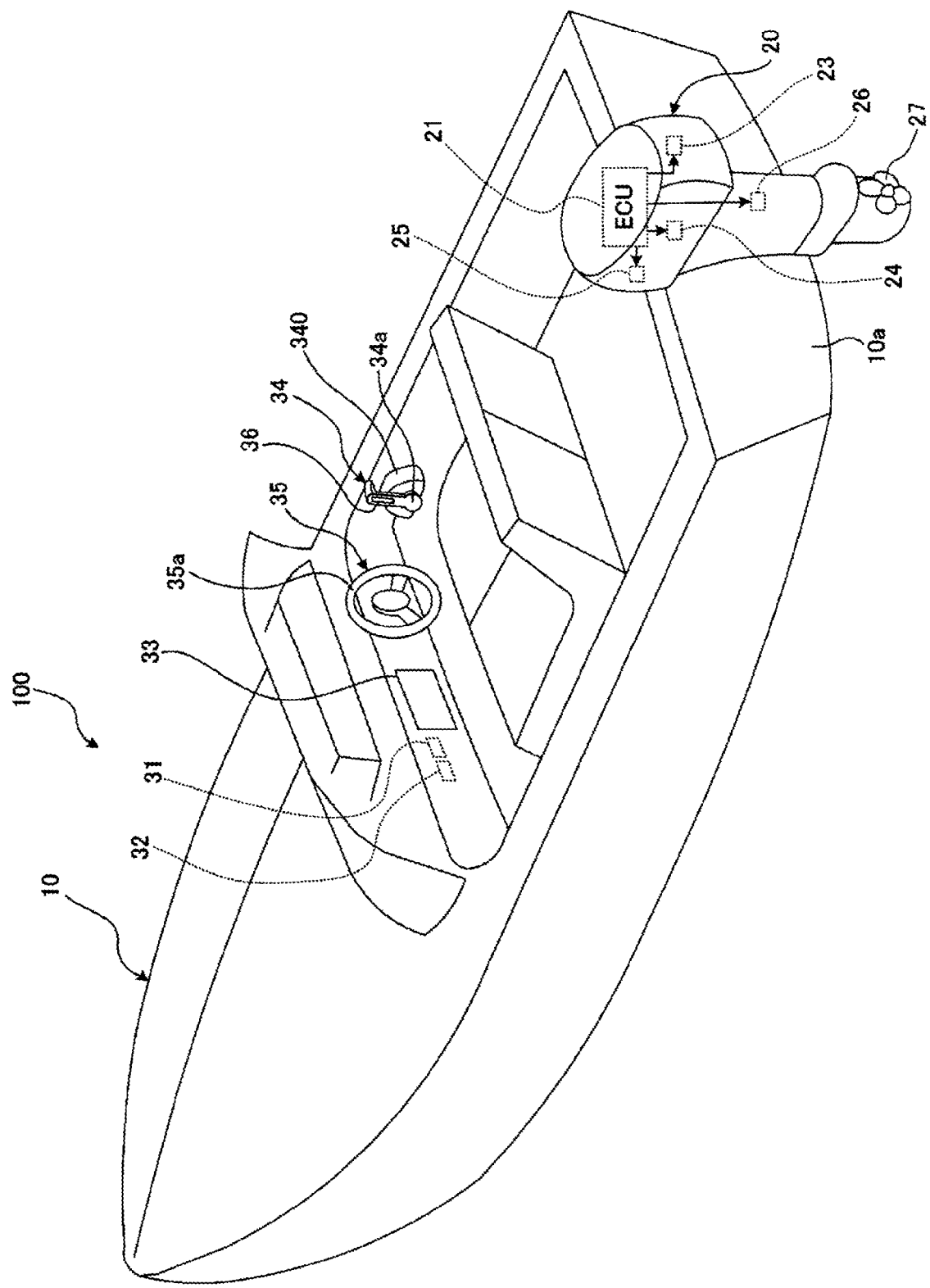
FIG. 1 is a schematic view showing an external configuration of a vessel 100 which includes a sailing assisting system according to an embodiment of the invention.

FIG. 1 is a schematic view showing an external configuration of a vessel 100 which includes a sailing assisting system according to an embodiment of the invention.

The vessel 100 includes a hull 10 and an outboard engine 20 as a propelling system attached to a transom 10a of the hull 10, a direction sensor 31, a GPS receiver 32, a display unit 33 configured by a liquid crystal display device and the like, a shift and throttle controller 34, a steering device 35, and a trim switch 36 which are provided on the hull 10.

The direction sensor 31 detects a direction in which a bow of the hull 10 is directed and outputs a signal indicating the detected direction.

The GPS receiver 32 detects a position of the hull 10 based on a signal received from a GPS satellite and outputs a signal indicating the detected position.

The outboard engine 20 includes an Electronic Control Unit (ECU) 21, an internal combustion engine whose illustration is omitted, a propeller 27 which is rotated by means of power from the internal combustion engine, a throttle motor 23, a steering motor 24, a trim angle control motor 25 and a shift motor 26.

The throttle motor 23 is an actuator for driving a throttle valve of the internal combustion engine to be opened and closed.

The steering motor 24 is an actuator for driving a steering mechanism for turning the outboard engine 20 about a vertical axis thereof so as to change the direction of the outboard engine 20 with respect to a direction in which the bow and the transom 10a of the hull 10 are connected together.

The trim angle control motor 25 is an actuator for driving a trim angle control mechanism for controlling a trim angle of the outboard engine 20 relative to the hull 10.

The shift motor 26 is an actuator for driving a shift mechanism for switching rotational directions of the propeller 27 clockwise (forwards) and counterclockwise (backwards).

The ECU 21 is configured to communicate with the direction sensor 31, the GPS receiver 32, the display unit 33, the shift and throttle controller 34, the steering device 35 and the trim switch 36 by wire or in a wireless manner.

The ECU 21 is connected with the direction sensor 31, the GPS receiver 32, the display unit 33, the shift and throttle controller 34, the steering device 35 and the trim switch 36 through a communication system (for example, NMEA 2000, or specifically, Controlled Area Network (CAN)) which is specified under, for example, National Marine Electronics Association (NMEA) of the United States of America.

The shift and throttle controller 34 includes a rotational shaft whose illustration is omitted and which is supported rotatably in an interior of a remote control box 340 which is disposed near a steering or control seat, a shift and throttle lever 34a which is attached to the rotational shaft to freely oscillate forwards and backwards from its initial position, and a lever position sensor whose illustration is omitted and which is disposed in the interior of the remote control box 340.

The lever position sensor detects an operated position of the shift and throttle lever 34a to which the shift and throttle lever 34a is operated by a steersman (a rotational angle of the rotational shaft of the shift and throttle controller 34) and outputs a signal according to the operated position so detected. The signal outputted from the lever position sensor is sent to the ECU 21.

This rotational angle is set such that for example, 0 degree represents a state where the shift and throttle lever 34a is in its initial position. Then, when the shift and throttle lever 34a is pushed to tilt forwards beyond the initial position, the rotational angle changes by 90 degrees, while when the shift and throttle lever 34a is pulled to tilt backwards beyond the initial position, the rotational angle changes by −90 degrees.

An absolute value of the rotational angle of the rotational shaft of the shift and throttle controller 34 is controlled to be associated with the throttle valve position of the internal combustion engine of the outboard engine 20.

When receiving a signal corresponding to a rotational angle of the rotational shaft of the sift and throttle controller 34, the ECU 21 controls the throttle motor 23 such that the throttle valve position takes a value which corresponds to an absolute value of the rotational angle of the rotational shaft. A revolution speed of the propeller 27 increases as the absolute value of the rotational angle of the rotational shaft of the shift and throttle controller 34 increases.

Signs of rotational angles of the rotational shaft of the shift and throttle controller 34 (rotational directions of the shift and throttle lever 34a) are controlled to be associated with rotational directions of the propeller 27.

For example, a rotational angle with a positive sign is associated with a forward direction as a rotational direction of the propeller 27, while a rotational angle with a negative sign is associated with a backward direction as a rotational direction of the propeller 27. The hull 10 travels forwards by the propeller 27 being rotated forwards, while the hull 10 travels backwards by the propeller 27 being rotated backwards.

When receiving a signal corresponding to a rotational angle of the rotational shaft of the sift and throttle controller 34, the ECU 21 controls the shift motor 26 such that the rotational direction of the propeller 27 corresponds to the rotational direction of the rotational shaft.

The shift and throttle controller 34 functions as a movable controlling device configured to instruct the revolution speed of the propeller 27 which is included in the outboard engine 20 and the rotational direction of the propeller 27.

Although the shift and throttle controller 34 can be configured by a single device for instructing the revolution speed and rotational direction of the propeller, the shift and throttle controller 34 may be configured by a control device for instructing the revolution speed of the propeller 27 and a control device for instructing the rotational direction of the propeller 27 which are provided separately.

The steering device 35 includes a steering wheel 35a which is configured to turn freely about a shaft as a rotational shaft, and a steering angle sensor which is provided near the shaft to detect a steering angle of the steering wheel 35a and outputs a signal corresponding to the steering angle detected. A signal corresponding to the steering angle outputted from the steering angle sensor is sent to the ECU 21.

The steering angle of the steering wheel 35a and the turning angle of the outboard engine 20 about the vertical axis are controlled to be associated with each other. When receiving a signal corresponding to a steering angle of the steering wheel 35a, the ECU 21 controls the steering motor 24 such that the turning angle of the outboard engine 20 becomes a turning angle corresponding to the steering angle of the steering wheel 35a.

The steering device 35 functions as a movable controlling device for instructing a posture that the outboard engine 20 takes (a direction of the outboard engine 20 which is determined by a turning angle thereof about the vertical axis).

The trim switch 36 is integrated with the shift and throttle lever 34a in the example shown in FIG. 1.

The trim switch 36 includes a movable member which can move forwards and backwards from its initial position and a position sensor for detecting a position of the movable member to output a signal corresponding to the detected position. A signal corresponding to the position of the movable member which is outputted from the position sensor is sent to the ECU 21.

The ECU 21 controls the trim angle control motor 25 to increase the trim angle by a predetermined amount step by step while it is receiving a signal indicating that the movable member is positioned further forwards than the initial position from the trim switch 36.

The ECU 21 controls the trim angle control motor 25 to decrease the trim angle by a predetermined amount step by step while it is receiving a signal indicating that the movable member is positioned further backwards than the initial position from the trim switch 36.

The trim switch 36 functions as a movable controlling device for instructing a posture (a trim angle) that the outboard engine 20 takes.

Figure 2:
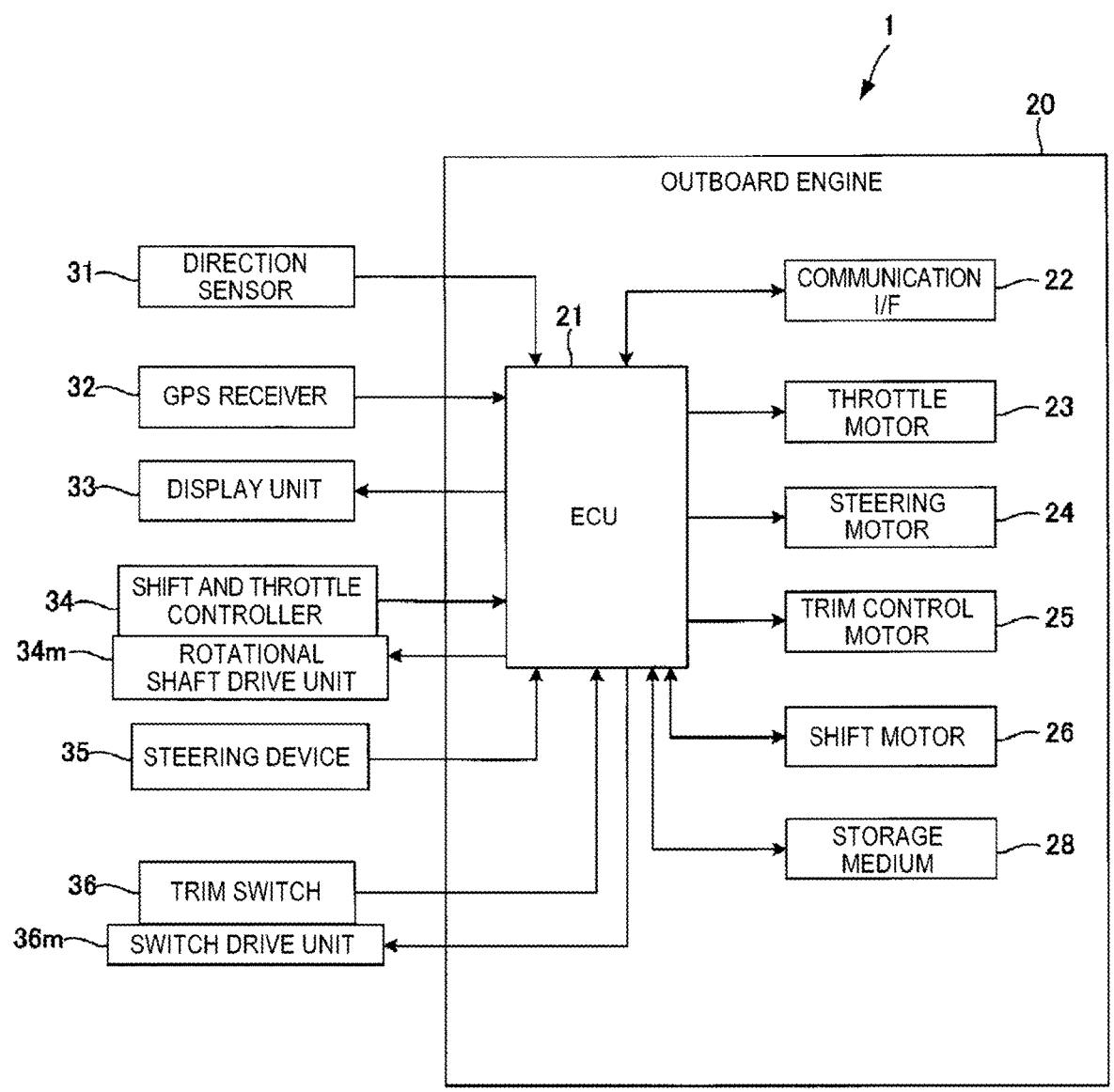
FIG. 2 is a block diagram showing a main configuration of hardware of a sailing assisting system 1 included in the vessel 100 shown in FIG. 1.

FIG. 2 is a block diagram showing a main configuration of hardware of the sailing assisting system 1 included in the vessel 100 shown in FIG. 1.

The sailing assisting system 1 includes the direction sensor 31, the GPS receiver 32, the display unit 33, the shift and throttle controller 34, a rotational shaft drive unit 34m, the steering device 35, the trim switch 36, a switch drive unit 36m and the outboard engine 20.

The rotational shaft drive unit 34m includes a motor for driving the rotational shaft of the shift and throttle controller 34 and a driver for driving the motor and operates based on an instruction from the ECU 21. The rotational shaft of the shift and throttle controller 34 can rotate within a first angular range (−90 degrees to +90 degrees).

The rotational shaft drive unit 34m controls a movable range where the rotational shaft of the shift and throttle controller 34 can rotate to become a second angular range which is narrower than the first angular range by driving the rotational shaft of the shift and throttle controller 34 by the motor.

When receiving an instruction from the ECU 21, the rotational shaft drive unit 34m applies an operation reaction force by driving the rotational shaft in an opposite direction to the rotational direction of the rotational shaft. This operation reaction force controls the rotational shaft not to rotate beyond a predetermined angle.

The trim switch drive unit 36m includes a motor for driving the movable member of the trim switch 36 and a driver for driving the motor and operates based on an instruction from the ECU 21. The switch drive unit 36m controls a movable range of the movable member by driving the movable member of the trim switch 36 by the motor.

When receiving an instruction from the ECU 21, the switch drive unit 36m does not drive the movable member when the movable member is shifted further forwards than the initial position while the switch drive unit 36m applies an operation reaction force by driving the motor to shift the movable member forwards when the movable member is operated to be shifted further backwards than the initial position. This operation reaction force controls the movable member not to be shifted further backwards than the initial position.

The rotational shaft drive unit 34m and the switch drive unit 36m both configure actuators for driving the corresponding controlling devices.

The outboard engine 20 includes the ECU 21, a communication interface (I/F) 22, the throttle motor 23, the steering motor 24, the trim angle control motor 25, the shift motor 26 and a storage medium 28. Although not shown in FIG. 2, the outboard engine 20 further includes the internal combustion engine, the steering mechanism, a trim angle controlling mechanism and the propeller 27.

The communication I/F 22 is an interface for communicating with an electronic device such as a smartphone which can connect with a mobile telephone network or an interface for connecting direct with the mobile telephone network.

The storage medium 28 stores information on specific water areas where the sailing of the vessel 100 is limited and includes a semiconductor memory and the like, for example, a flash memory. The storage medium 28 may be of a portable type which can be detachably attached to the outboard engine 20.

The specific water area includes a speed limiting water area within a harbor or a bay where a sailing speed of a vessel is limited to a predetermined sailing speed, a shallow water area, or a water area where sunken rocks exist under the surface of water.

The ECU 21 includes a microcomputer including a Read Only Memory (ROM) and a Random Access Memory (RAM).

Figure 3:
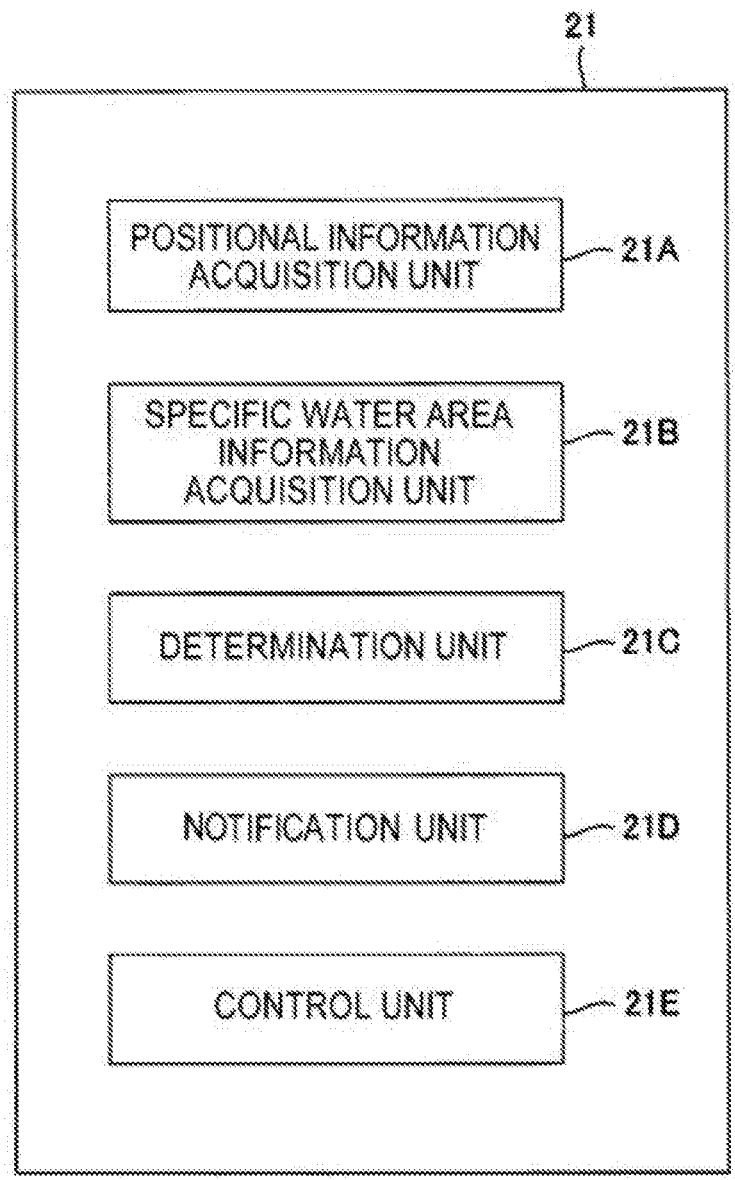
FIG. 3 is a diagram showing an example of functional blocks of an ECU 21 in an outboard engine 20 shown in FIG. 1.

FIG. 3 is a diagram showing an example of functional blocks of the ECU 21 in the outboard engine 20 shown in FIG. 1.

In the ECU 21, a processor executes programs installed in the ROM which is included therein and cooperates with the various types of hardware devices, whereby the ECU 21 functions as a positional information acquisition unit 21A, a specific water area information acquisition unit 21B, a determination unit 21C, a notification unit 21D, and a control unit 21E.

The positional information acquisition unit 21A acquires positional information indicating a position of the hull 10 periodically from the GPS receiver 32 and stores the information acquired in the RAM.

The specific water area information acquisition unit 21B acquires information on the specific water area periodically from an exterior server via the communication I/F 22 and stores the information acquired in the storage medium 28. It is also possible to acquire information on the specific water area using an Automatic Identification System (AIS) in place of the communication I/F 22.

The determination unit 21C determines whether the hull 10 stays within the speed limiting water area, the shallow water area, or the water area with sunken rocks as the specific water area based on information regarding the specific water area which is acquired by the specific water area information acquisition unit 21B and information on the position of the hull 10 which is acquired by the positional information acquisition unit 21A.

The determination unit 21C determines that the hull 10 stays within the specific water area when the positional information of the hull 10 indicates that the position of the hull 10 is within the specific water area. The determination unit 21C determines that the hull 10 stays out of the specific water area when the positional information of the hull 10 indicates that the position of the hull 10 is out of the specific water area.

When the determination unit 21C determines that the hull 10 stays within the specific water area, the notification unit 21D notifies the steersman that the hull 10 is in such a state and that the operation of the hull 10 will be limited partially.

For example, the notification unit 21D notifies the steersman by displaying a message notifying that the vessel 100 stays within the specific water area and that the operation of the hull 10 is limited partially on the display unit 33.

Alternatively, the notification unit 21D notifies the steersman of this message by causing the message to be outputted from a speaker set on the hull 10 in the form of audio.

When the determination unit 21C determines that the hull 10 stays within the specific water area, the control unit 21E controls the rotational shaft drive unit 34m to limit the movable range of the rotational shaft of the shift and throttle controller 34 or controls the switch drive unit 36m to limit the movable range of the movable member of the trim switch 36.

Figure 4:
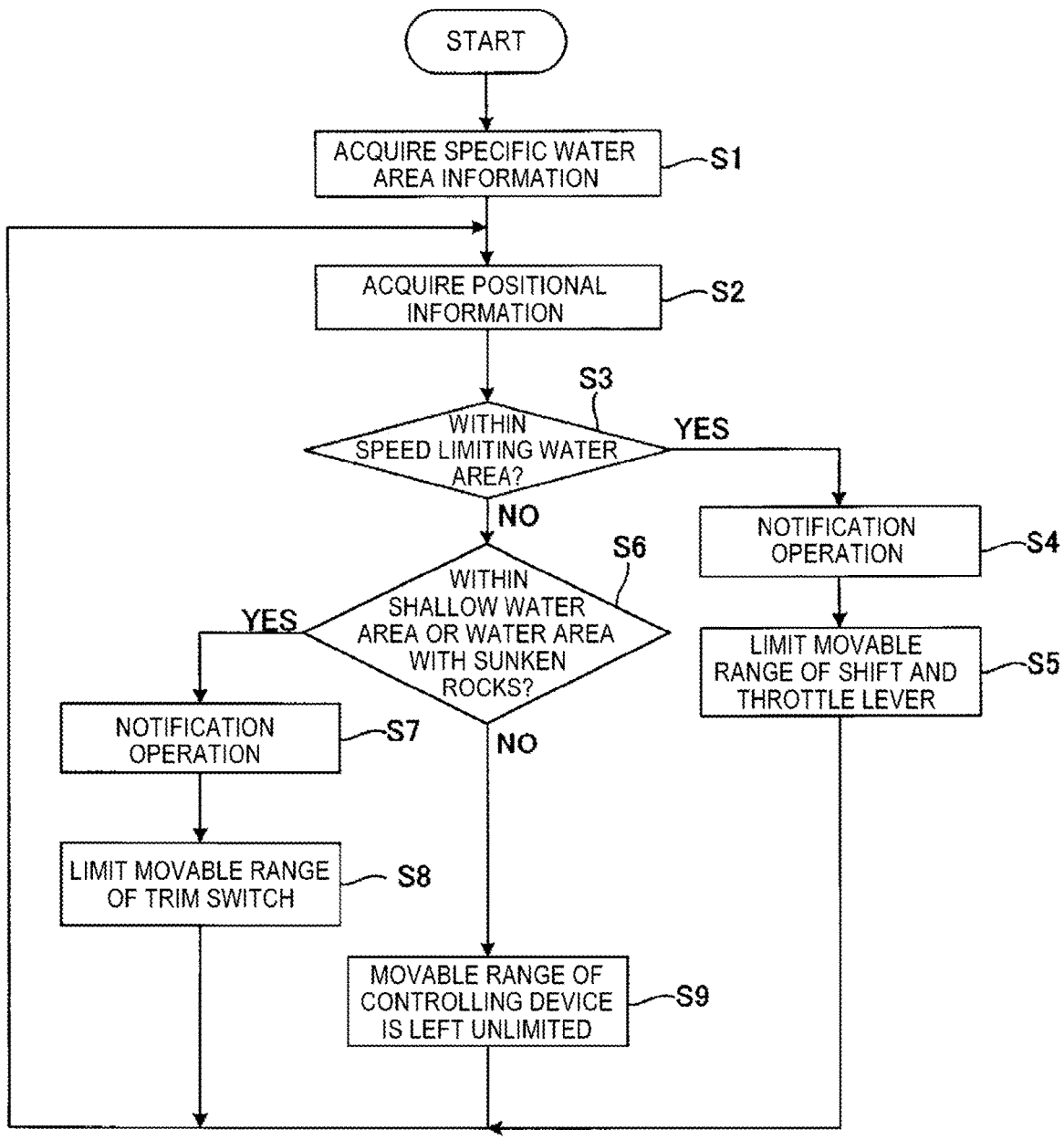
FIG. 4 is a flowchart illustrating operations of the sailing assisting system 1 shown in FIG. 2.

FIG. 4 is a flowchart illustrating operations of the sailing assisting system 1 shown in FIG. 2.

When the outboard engine 20 is actuated to operate, the specific water area information acquisition unit 21B acquires specific water area information and stores the information in the storage medium 28 (Step S1). It should be noted that the specific water area information may be stored manually in the storage medium 28 by the steersman.

Thereafter, when a predetermined timing is reached, the positional information acquisition unit 21A acquires positional information of the hull 10 and stores the information in a RAM (Step S2).

After Step S1 and Step S2, the determination unit 21C determines whether the hull 10 stays in the speed limiting water area designated as the specific water area by comparing the specific water area information stored in Step S1 with the positional information stored in Step S2 (Step S3).

If the determination unit 21C determines that the hull 10 stays within the speed limiting water area (Step S3: YES), the notification unit 21D executes the notification operation described above (Step S4).

Thereafter, the control unit 21E acquires information regarding a sailing speed of the vessel 100 based on information from the GPS receiver 32 or information from a speedometer (not show) which is provided on the hull 10.

Then, the control unit 21E instructs to limit the movable range of the rotational shaft of the shift and throttle controller 34 when the sailing speed exceeds a maximum sailing speed designated for the speed limiting water area.

When receiving this instruction, the rotational shaft drive unit 34m drives the motor to rotate the rotational shaft in the opposite direction to the rotational direction thereof, thereby applying an operation reaction force. This limits the movable range of the rotational shaft to the range which is narrower than the first angular range (Step S5).

The operation in Step S5 causes the shift and throttle lever 34a to rotate only within the range where the sailing speed does not exceed the maximum sailing speed, whereby the sailing speed of the vessel 100 is controlled not to be faster than the maximum limited sailing speed.

If the determination unit 21C determines that the hull 10 does not stay within the speed limiting water area (Step S3: NO), the determination unit 21C determines whether the hull 10 stays within the shallow water area or the water area with sunken rocks which is designated as the specific water area (Step S6).

If the determination unit 21C determines that the hull 10 stays within the shallow water area or the water area with sunken rocks (Step S6: YES), the notification unit 21D executes the notification operation described above (Step S7).

Thereafter, the control unit 21E sends an instruction to limit the movable range of the movable member of the trim switch 36 to a range (specifically, a range further forwards than the initial position) which can avoid a contact of the outboard engine 20 with the seabed, to the switch drive unit 36*m*.

Upon receipt of this instruction, the switch drive unit 36*m* drives the motor to shift the movable member towards the initial position to thereby apply an operation reaction force when it is detected that the movable member is positioned further backwards than the initial position. This limits the movable range of the movable member such that the movable member is permitted only to move forwards of the initial position (Step S8), and hence, the steersman cannot instruct to trim down the outboard engine 20 even though the steersman attempts to do so.

There is a high possibility that the outboard engine 20 is brought into contact with the seabed when the outboard engine 20 is trimmed down within the shallow water area or the water area with sunken rocks. Therefore, it is possible to prevent the occurrence of a contact of the outboard engine 20 with the seabed by prohibiting an issuance of a trim-down instruction.

If the determination unit 21C determines that the hull 10 does not stay within the shallow water area or the water area with sunken rocks (Step S6: NO), the control unit 21E does not instruct to limit the movable range (Step S9).

After Steps S5, S8 and S9, the flow of operations return to Step S2, and when the positional information is updated in Step S2, the operations in Step S3 and thereafter are performed again.

Thus, according to the sailing assisting system 1, when the hull 10 stays within the speed limiting water area, a reaction force acts on the shift and throttle lever 34*a*. This prevents the steersman from instructing that the hull 10 should be sailed at a speed exceeding the maximum sailing speed, thereby making it possible to support the safe sailing of the hull 10 observing the speed limit.

In addition, according to the sailing assisting system 1, when the hull 10 stays within the shallow water area or the water area with sunken rocks, an operation reaction force acts on the movable member of the trim switch 36. This prevents the steersman from instructing that the outboard engine 20 should be trimmed down, thereby making it possible to support the safe sailing of the hull 10 by preventing a contact of the outboard engine 20 with the seabed.

According to the sailing assisting system 1, these effects can be realized by controlling only the rotational shaft drive unit 34*m* and the switch drive unit 36*m* without changing the control parameters of the internal combustion engine particularly. This can prevent the increase in production cost of the outboard engine 20.

In addition, an appropriate sailing is supported not by changing the control parameters of the internal combustion engine but by limiting the movable range of the controlling device. This enables the steersman to recognize instinctively that the sailing of the hull 10 is assisted by operating the controlling device, whereby the steersman can operate the hull 10 without strange feeling.

Figure 5:
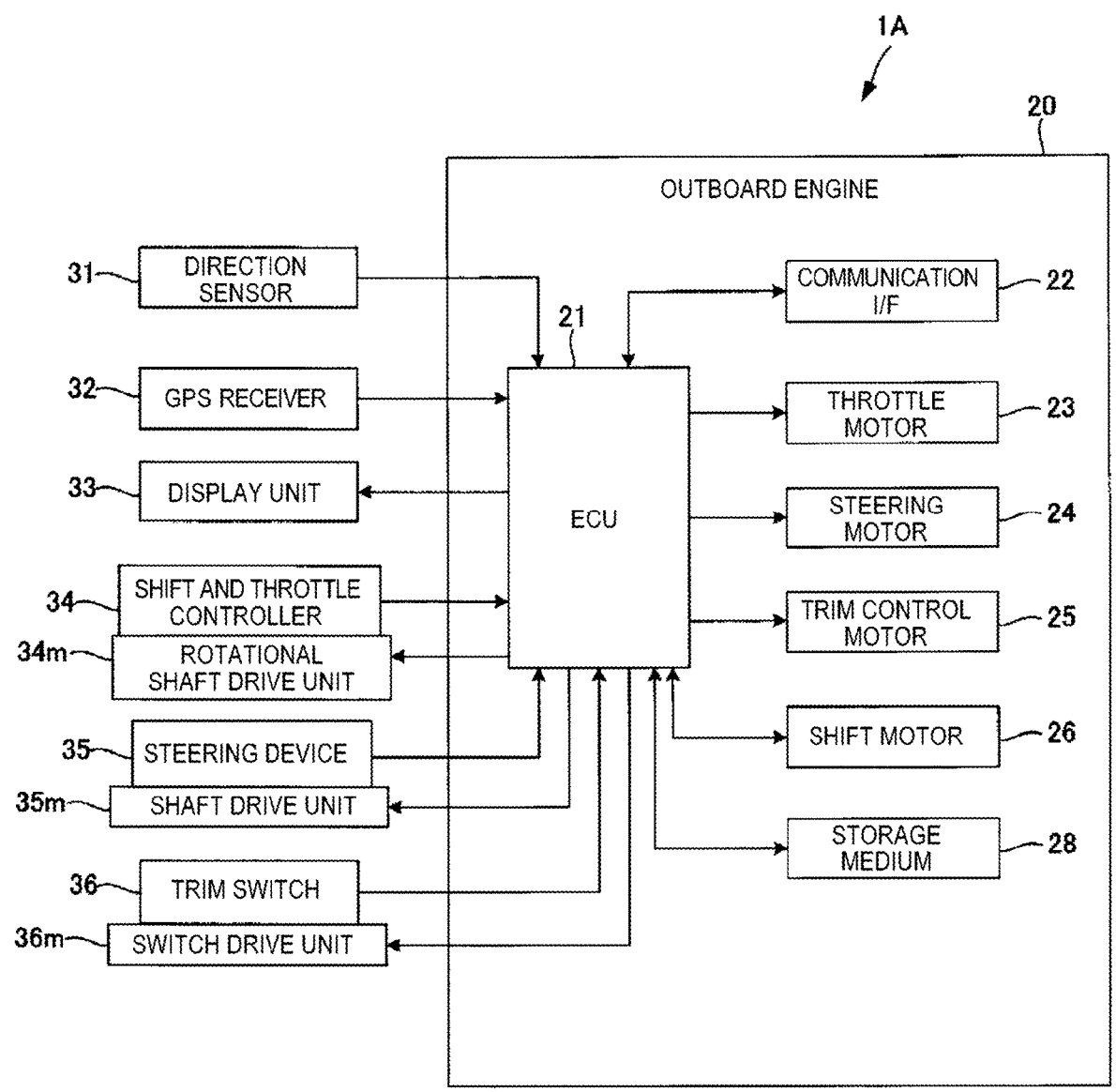
FIG. 5 is a block diagram showing a main configuration of hardware of a sailing assisting system 1A which is a modified example of the sailing assisting system 1 shown in FIG. 2.

FIG. 5 is a block diagram showing a main configuration of hardware of a sailing assisting system 1A which is a modified example of the sailing assisting system 1 shown in FIG. 2. In FIG. 5, the same reference numerals will be given to configurations similar to those shown in FIG. 2, and the description thereof will be omitted here.

A specific water area which is described in relation to this sailing assisting system 1A includes a shallow water area, a water area with sunken rocks or an entrance prohibiting area where an entrance of a vessel is prohibited.

The sailing assisting system 1A shown in FIG. 5 has the same configuration as that of the sailing assisting system 1 except that a shaft drive unit 35*m* is added and that functions of an ECU 21 are partially changed.

The shaft drive unit 35*m* includes a motor for driving a shaft of a steering device 35 and a driver for driving the motor and operates based on an instruction from the ECU 21. The shaft of the steering device 35 can rotate within a third angular range.

The shaft drive unit 35*m* controls the movable range where the shaft of the steering device 35 can rotate to become a fourth angular range which is narrower than the third angular range by driving the shaft of the steering device 35 by the motor.

When receiving an instruction from the ECU 21, the shaft drive unit 35*m* does not drive the shaft of the steering device 35 when the shaft is operated to be rotated within the fourth angular range while when the shaft is operated to be rotated beyond the fourth angular range, the shaft drive unit 35*m* drives the shaft to rotate in an opposite direction to the rotational direction of the shaft to thereby apply an operation reaction force. The shaft is controlled not to be rotated beyond the fourth angular range by the operation reaction force.

The shaft drive unit 35*m* configures an actuator for driving the steering device 35 as the controlling device.

Figure 6:
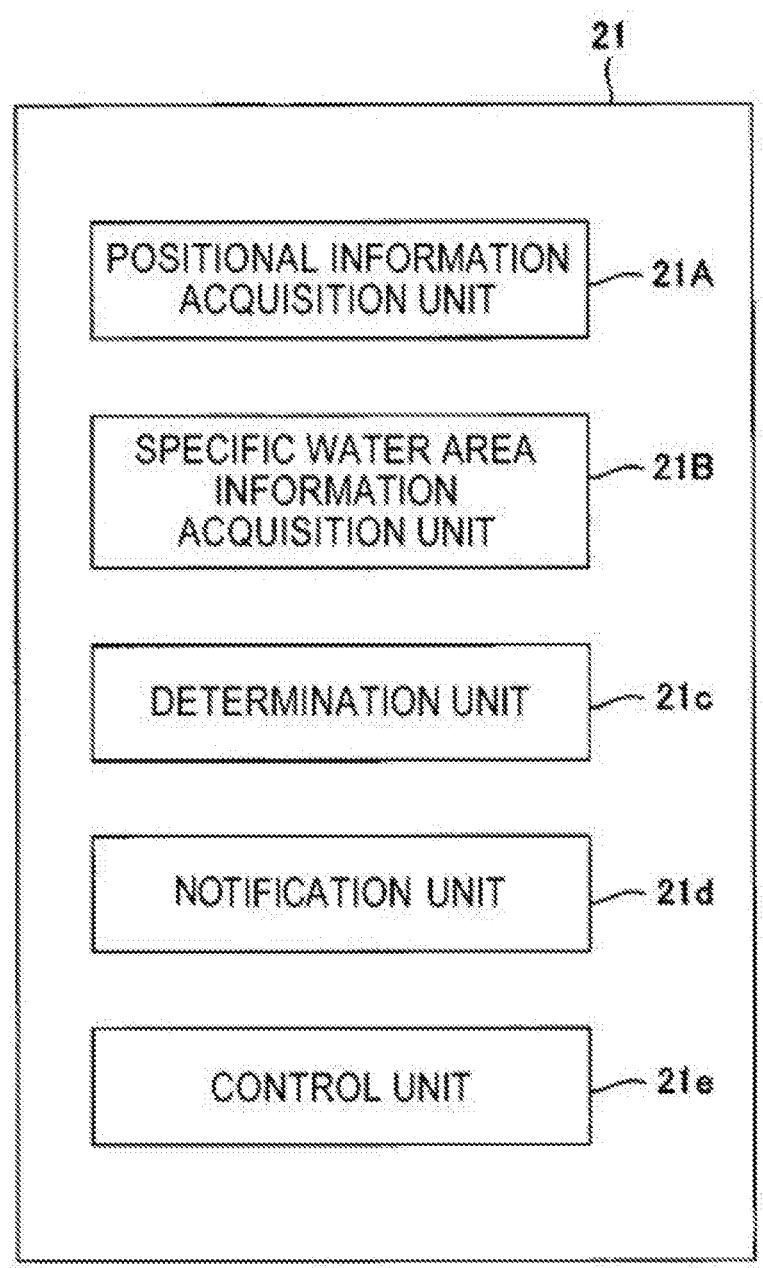
FIG. 6 is a diagram showing functional blocks of an ECU 21 in the sailing assisting system 1A shown in FIG. 5.

FIG. 6 is a diagram showing functional blocks of the ECU 21 in the sailing assisting system 1A shown in FIG. 5. In FIG. 6, the same reference numerals will be given to configurations similar to those shown in FIG. 3, and the description thereof will be omitted here.

The ECU 21 shown in FIG. 6 has the same configuration as that shown in FIG. 3 except that the determination unit 21C is modified into a determination unit 21*c*, that the notification unit 21D is modified into a notification unit 21*d* and that the control unit 21E is modified into a control unit 21*e*.

The determination unit 21*c* determines whether there is a possibility that a hull 10 enters a shallow water area, a water area with sunken rocks or a sailing prohibiting water area as a specific water area based on information regarding the specific water area which is acquired by a specific water area information acquisition unit 21B and information regarding the position of the hull 10 which is acquired by a positional information acquisition unit 21A.

For example, the determination unit 21*c* acquires information on a sailing speed of a vessel 100 based on information from a GPS receiver 32 or information from a speedometer (not shown) which is provided on the hull 10 and acquires further information on a direction in which the vessel 100 sails from a direction sensor 31. Then, the determination unit 21C determines whether the specific water area exists on a sailing course of the hull 10 based on the acquired directional information and the acquired information on the specific water area.

When determining that the specific water area exists on the sailing course of the hull 10, the determination unit 21*c* calculates a distance from a current position of the hull 10 which is stored in a RAM to the specific water area and determines that there is a possibility that the hull 10 enters the specific water area when the calculated distance is equal to or shorter than a threshold which is determined in advance.

If the determination unit 21*c* determines that there is a possibility that the hull 10 enters the specific water area, the notification unit 21*d* notifies the steersman that the hull 10 is in such a state and that the operation of the hull 10 is limited partially. A notification method executed by the notification unit 21*d* is similar to by the notification unit 21D, and hence, the description thereof will be omitted here.

If the determination unit 21*c* determines that there is a possibility that the hull 10 enters the specific water area, the control unit 21*e* controls the rotational shaft drive unit 34*m* to limit the movable range of the rotational shaft of the shift and throttle controller 34 or controls the shaft drive unit 35*m* to limit a movable range of the steering device 35.

Figure 7:
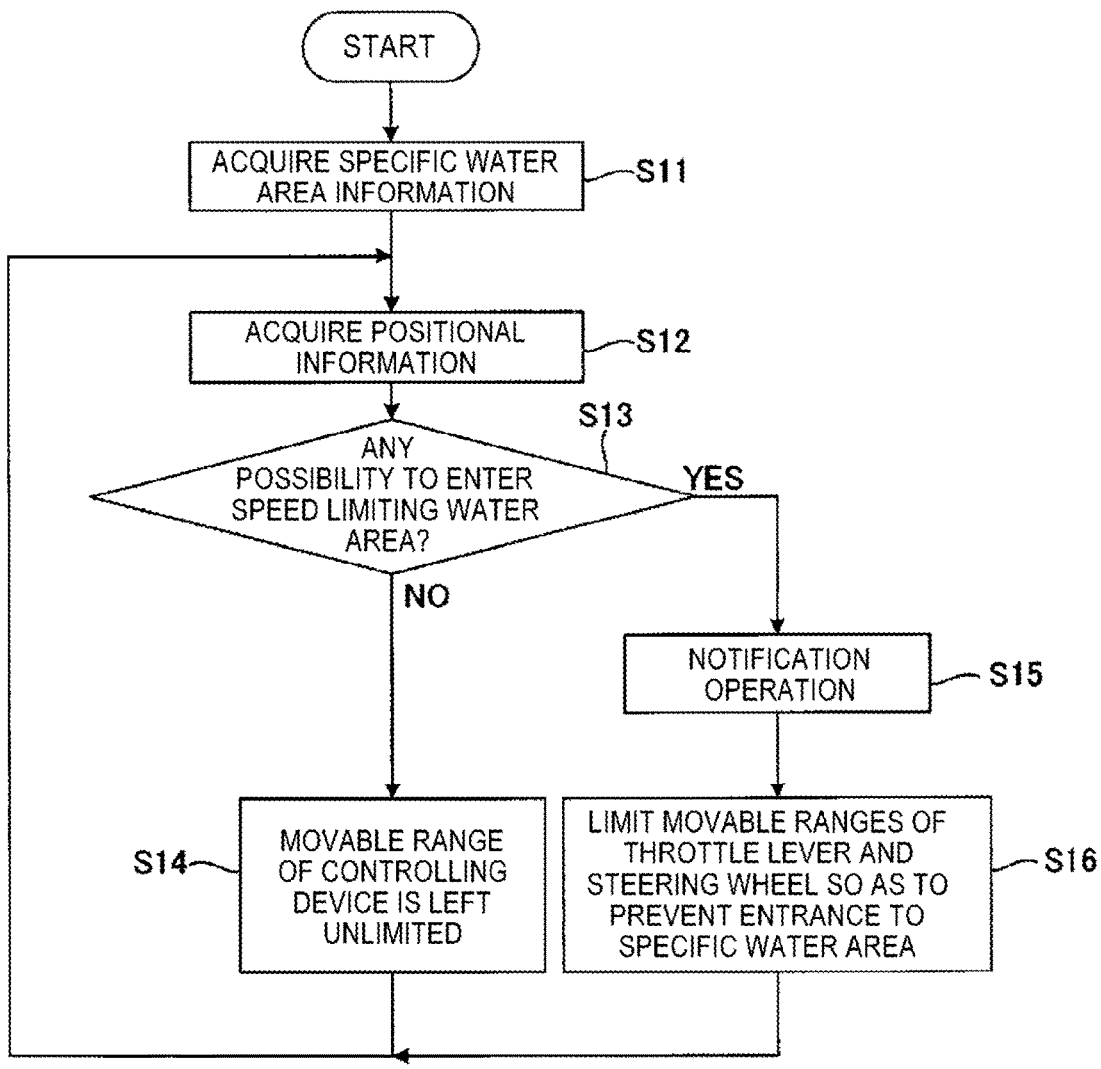
FIG. 7 is a flowchart illustrating operations of the sailing assisting system 1A shown in FIG. 5.

FIG. 7 is a flowchart illustrating operations of the sailing assisting system 1A shown in FIG. 5.

When the outboard engine 20 is actuated to operate, the specific water area information acquisition unit 21B acquires specific water area information and stores the information in the storage medium 28 (Step S11). Thereafter, when a predetermined timing is reached, the positional information acquisition unit 21A acquires positional information of the hull 10 and stores the information in a RAM (Step S12).

After Steps S11 and S12, the determination unit 21*c* determines whether there is a possibility that the hull 10 enters the shallow water area, the water area with sunken rocks or the sailing prohibiting water area based on the specific water area information stored in Step S11, the positional information stored in Step S12 and the directional information acquired from the direction sensor 31 (Step S13).

If the determination unit 21*c* determines that there is a possibility that the hull 10 enters the shallow water area, the water area with sunken rocks or the sailing prohibiting water area (Step S13: YES), the notification unit 21*d* executes notification operation (Step S15).

Thereafter, the control unit 21*e* sends instructions to limit movable ranges of a shift and throttle lever 34*a* and a steering wheel 35*a* to such ranges that the hull 10 is prevented from entering the specific water area to the rotational shaft drive unit 34*m* and the shaft drive unit 35*m*, respectively.

For example, the control unit 21*e* instructs to limit the movable range of the shift and throttle lever 34*a* such that the sailing speed becomes smaller than a current value and to limit the movable range of the steering wheel 35*a* such that the sailing course of the hull 10 does not overlap the specific water area.

When receiving this instruction, the rotational shaft drive unit 34*m* controls the motor to rotate the rotational shaft in an opposite direction to the rotational direction thereof to apply an operation reaction force if a rotational angle of the rotational shaft which is detected by a lever position sensor of the shift and throttle controller 34 reaches an angle of an end portion of a limit range. This limits the movable range of the rotational shaft.

In addition, upon receipt of the instruction, the shaft drive unit 35*m* controls the motor to rotate the shaft such that a steering angle detected by a steering angle sensor of the steering device 35 falls in the limit range.

Further, when the steering angle detected by the steering angle sensor of the steering device 35 reaches the angle of the end portion of the limit range, the shaft drive unit 35*m* controls the motor to rotate the shaft in the opposite direction to the rotational direction thereof to apply an operation reaction force. This limits the movable range of the shaft (Step S16).

If the determination unit 21*c* determines that there is no possibility that the hull 10 enters the shallow water area, the water area with sunken rocks or the sailing prohibiting water area (Step S13: NO), the control unit 21*e* does not instruct to limit the movable ranges of the shift and throttle controller 34 and the steering device 35 (Step S14).

After Steps S14 and S16, the flow of operations return to Step S12. Then, the positional information is updated in Step S12, and the operations in Step S13 and thereafter are performed again.

The control unit 21*e* may instruct to limit the movable range of the shift and throttle lever 34*a* (or to prevent the shift and throttle lever 34*a* from shifting further forwards than the initial position) such that the propeller 27 rotates only in the opposite direction after Step S15.

In this case, the rotational shaft drive unit 34*m* which receives the instruction is driven, and the shift and throttle lever 34*a* is allowed to move only further backwards than the initial position. This prevents the vessel 100 from traveling forwards, thereby making it possible to prevent the entrance of the vessel 100 to the specific water area.

In this case, the steersman's reversing the hull 10 while controlling the steering device 35 makes the determination made in Step S13 negative or NO, thereafter the hull 10 is allowed to travel forwards again.

Alternatively, the determination unit 21*c* may determine that there is a possibility that the hull 10 enters the specific water area with a distance between the hull 10 and the specific water area being equal to or smaller than a threshold although the specific water area does not exist on a sailing course of the hull 10 which is obtained from the direction of the hull 10.

In this way, the control unit 21*e* limits the movable range of the steering wheel 35*a* such that the sailing course of the hull 10 does not overlap the specific water area when the specific water area does not exist on the sailing course of the hull 10 and the distance between the hull 10 and the specific water area is equal to or smaller than the threshold.

This prevents the steersman from sailing the hull 10 towards the specific water area. This prevents in turn the hull 10 from entering the specific water area.

Thus, the sailing assisting system 1A limits the movable range of at least one of the shift and throttle controller 34 and the steering device 35 when there is a possibility that the hull 10 enters the specific water area, and therefore, the hull 10 can be prevented from entering the specific water area, thereby making it possible to support the safe sailing of the hull 10.

The sailing assisting system 1A can provide the effect described above only by controlling the rotational shaft drive unit 34*m* and the shaft drive unit 35*m* without changing the control parameters of the internal combustion engine particularly. This can prevent the increase in production cost of the outboard engine 20.

In addition, an appropriate sailing is supported not by changing the control parameters of the internal combustion engine but by limiting the movable range of the controlling device. This enables the steersman to recognize instinctively that the sailing of the hull 10 is assisted by operating the controlling device, whereby the steersman can operate the hull 10 without strange feeling.

The invention is not limited to the embodiment that has been described heretofore and hence can be modified or improved as required.

For example, in the sailing assisting system 1 and the sailing assisting system 1A which have been described heretofore, the direction sensor 31 and the GPS receiver 32 may be included in the outboard engine 20.

Additionally, a configuration may be adopted in which the outboard engine 20 has the shift and throttle controller 34, the rotational shaft drive unit 34m, the steering device 35, the shaft drive unit 35m, the trim switch 36 and the switch drive unit 36m.

Although the sailing assisting system 1 and the sailing assisting system 1A have the outboard engine 20 as the propelling system of the vessel 100, the propelling system may be configured by an inboard engine.

DESCRIPTION OF REFERENCE NUMERALS 1, 1A Sailing Assisting System
100 Vessel
10 Hull
10a Transom
20 Outboard Engine
21 ECU
21A Positional Information Acquisition Unit
21B Specific Water Area Information Acquisition Unit
21C, 21c Determination Unit
21D, 21d Notification Unit
21E, 21e Control Unit
22 Communication Interface
23 Throttle Motor
24 Steering Motor
25 Trim angle Control Motor
26 Shift Motor
27 Propeller
28 Storage Medium
31 Direction Sensor
32 GPS Receiver
33 Display Unit
34 Shift and Throttle Controller
34a Shift and Throttle Lever
34m Rotational Shaft Drive Unit
340 Remote Control Box
35 Steering Device
35a Steering Wheel
35m Shaft Drive Unit
36 Trim Switch
36m Switch Drive Unit

The invention claimed is:

1. A sailing assisting system for a vessel comprising:
a movable controlling device configured to instruct a revolution speed of a propeller included in a propelling system for the vessel and a posture of the propelling system;
a movable controlling device actuator that is configured to drive the movable controlling device;
a hull positional information acquisition unit that is configured to acquire positional information of a hull to which the propelling system is attached;
a hull location determination unit that is configured to determine, based on the positional information and information on a specific water area where sailing is limited, whether the hull stays within the specific water area or whether there is a possibility that the hull enters the specific water area; and
an actuator control unit that is configured to control the actuator to limit a movable range of the movable controlling device by applying an operation reaction force to the movable controlling device if the hull location determination unit determines that the hull stays within the specific water area or that there is the possibility that the hull enters the specific water area.

2. The sailing assisting system according to claim 1, wherein if the hull location determination unit determines that the hull stays within a speed limiting water area as the specific water area where a first sailing speed is set, the actuator control unit limits the movable range of the movable controlling device so that the movable controlling device instructs the revolution speed to be in a range where the first sailing speed constitutes an upper limit value of a sailing speed of the vessel.

3. The sailing assisting system according to claim 1, wherein the movable controlling device includes a trim angle controlling unit configured to instruct a trim angle of the propelling system as the posture, and
wherein if the hull location determination unit determines that the hull stays within a shallow water area or a water area with sunken rocks as the specific water area, the actuator control unit limits a movable range of the trim angle controlling unit to a range where a contact between the propelling system and a seabed is avoided.

4. The sailing assisting system according to claim 1, wherein the movable controlling device includes a propelling system direction instructing and controlling device configured to instruct a direction of the propelling system as the posture, and
wherein if the hull location determination unit determines that there is a possibility that the hull enters a shallow water area, a water area with sunken rocks or a sailing prohibiting water area as the specific water area, the control unit limits a movable range of the propelling system direction instructing and controlling device to a range where the hull is unable to enter the specific water area.

5. The sailing assisting system according to claim 1, wherein the movable controlling device includes a sailing direction instructing and controlling device configured to issue an instruction on a rotational direction of the propeller, and
wherein if the hull location determination unit determines that there is a possibility that the hull enters a shallow water area, a water area with sunken rocks or a sailing prohibiting water area as the specific water area, the actuator control unit limits a movable range of the sailing direction instructing and controlling device to a range where the hull is unable to sail forward.

6. The sailing assisting system according to claim 1, further comprising:
a notification unit configured to execute notification if the hull location determination unit determines that the hull stays within the specific water area or that there is a possibility that the hull enters the specific water area.

* * * * *